UNITED STATES PATENT OFFICE.

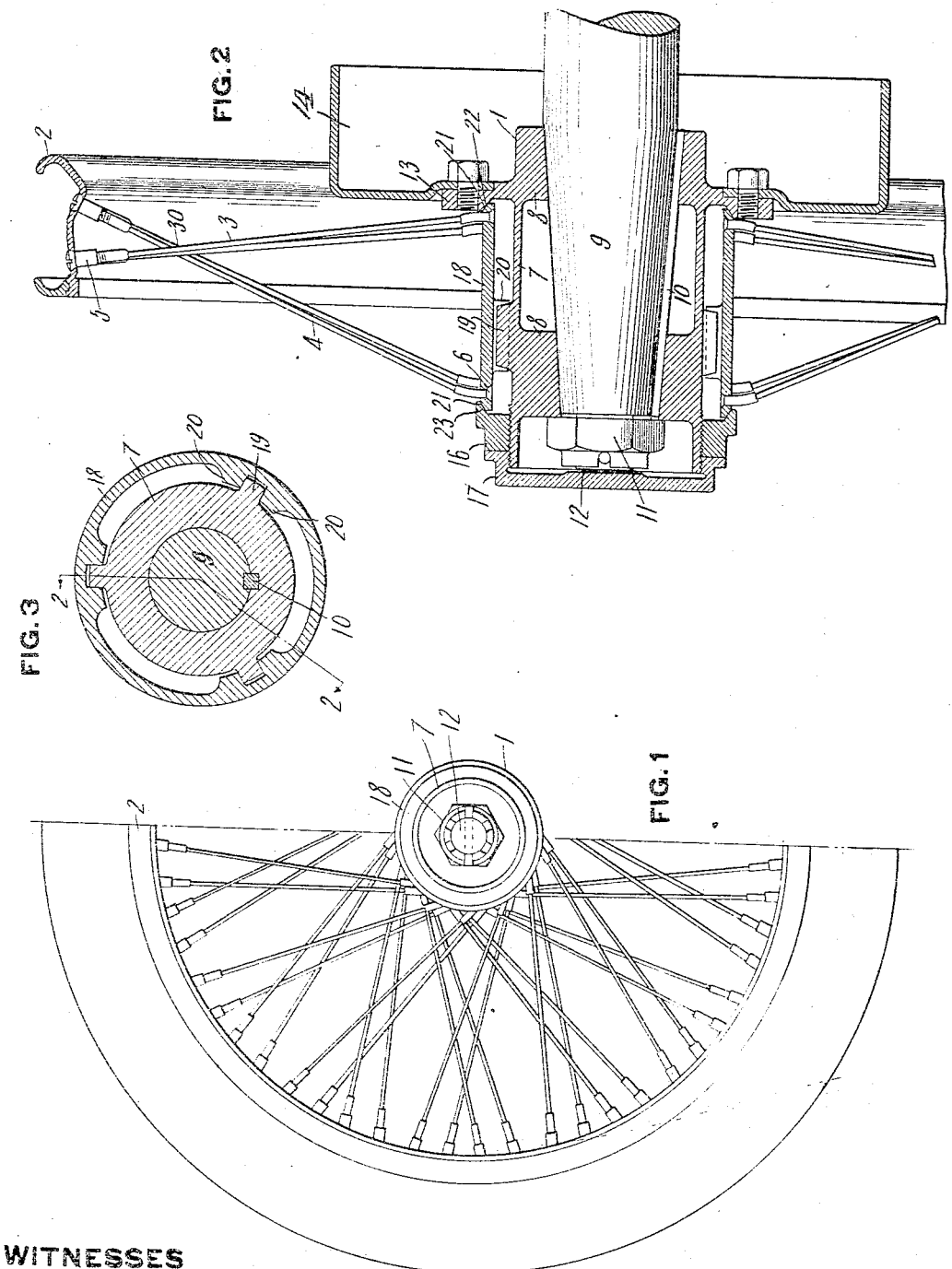

GEORGE BAEHR, OF McKEESPORT, PENNSYLVANIA.

VEHICLE-WHEEL.

1,168,373.

Specification of Letters Patent.

Patented Jan. 18, 1916.

Application filed October 13, 1913. Serial No. 794,864.

*To all whom it may concern:*

Be it known that I, GEORGE BAEHR, a resident of McKeesport, in the county of Allegheny and State of Pennsylvania, have invented a new and useful Improvement in Vehicle-Wheels, of which the following is a specification.

This invention relates to an improvement in vehicle wheels, and particularly in wire spoke wheels for automobiles and the like.

The object of the invention is to produce an improved vehicle wheel which is readily demountable from the axle, which may be fitted to any arrangement of axle end, whose hub is straight or cylindrical with an unbroken surface, thereby presenting a good appearance, and wherein there are no hooks or crannies for the lodgment of mud and water, whereby it is unnecessary to demount the wheel for cleaning and there is no liability of the demountable parts rusting fast to the inner or fixed hub member.

A further object of the invention is to provide a wheel embodying inner and outer hub members with clamping means for the outer hub member arranged so that the clamping strain is in line with and counteracts the strain of the spokes on the hub and wherein the end portions of the outer hub member are covered and reinforced by the clamping parts.

The invention comprises the construction and arrangement of parts hereinafter described and claimed.

In the drawings Figure 1 represents an elevation of half of a wheel embodying the invention, the hub cap being removed; Fig. 2 is a sectional elevation thereof; and Fig. 3 is a cross section on the line 3—3, Fig. 2.

Referring to the drawings which illustrate one embodiment of the invention, the wheel comprises a hub 1, rim 2, and two sets of wire spokes, namely, an inner set 3, and an outer set 4. The rim may be any ordinary type of rim, such as the quick detachable, and for either straight side or clencher tires, and is shown as the latter. The spokes are ordinary wire spokes formed of the best quality of drawn steel wire and provided on their outer ends with suitable nipples 5 for securing them to the rim, and on their inner ends with heads 6 for connecting them to the hub.

The hub 1, comprises an inner hub member 7 which is generally cylindrical in shape and of uniform diameter from end to end. Internally it has two or more transverse walls 8 provided with apertures through which the axle 9 projects. A key 10 fixes the axle to the hub and it is held thereon by a nut 11 screwed on the threaded end 12 of the axle.

The shape of the hub depends upon whether the wheel is a front wheel or a rear or driving wheel. In the latter case the inner end of the inner hub member may be provided with a flange 13 to which the brake drum 14 is rigidly secured.

The outer end of the inner hub member is externally threaded to receive a clamping nut 16 and a cover or dust cap 17, which also acts as a lock nut for the clamping nut 16.

The inner headed ends of the spokes 3 and 4 are secured to an outer hub member 18, which is tubular and whose inner diameter is somewhat greater than the external diameter of the inner hub member 7 to provide a clearance space therebetween. The inner hub member is provided on its outer surface with a plurality (three being shown) of driving clutch jaws or members 19, which extend longitudinally of the hub, and each of which lies between a pair of coöperating driving clutch jaws or members 20 projecting inwardly from the outer hub member. The driving jaws 19 have a fairly close fit between the driving jaws 20, and both sets of jaws have substantially radial side faces *a* so that the inner hub member positively drives the outer hub member in either direction without looseness or play and without wedging or camming action. The outer hub member is rigidly secured to the inner hub member and is centralized with respect thereto by the clamping nut 16. As shown, the outer hub member is provided on its opposite ends with beveled or inclined clamping faces 21, one of which coöperates with a similarly beveled clamping face or abutment 22 on the inner hub member, and the other with a like clamping face 23 on the inner portion of the clamping nut 16. When the clamping nut 16 is screwed up tight the inner end of the outer hub member is forced up against the clamping face or abutment 22 and also wedges against the clamping face of the clamping nut 16 and is thereby rigidly held in place. The wedging action of the clamp compresses the outer hub member inwardly and acts in the same general line as the spokes. Consequently, the clamping nut tends to counteract the outward pull of the spokes on the hub. Moreover, the opposite end portions of the outer hub are covered and are reinforced by the clamping nut and the abutment 22 and the spokes are attached close to the ends of the hub, thereby minimizing the liability of the spokes tearing out a portion of the hub when under unusual strain.

In the form shown, the rim 2 is in a plane near the inner end of the hub, so that the outer spokes 4 are somewhat longer than the spokes 3. The two rows of spokes cross, as shown at 30, and they are threaded up in the manner shown in Fig. 1, each spoke being substantially tangential to the hub where secured thereto.

To remove the wheel from the hub the dust cap 17 is removed, thereby releasing the clamping nut 16. The latter is then unscrewed from the inner hub member, when the outer hub member carrying the spokes and rim can be readily slid endwise from the hub. The clearance space between the inner and outer hub members prevents them from rusting fast, so that the wheels do not have to be forced off from the axles. Moreover, the inclined clamping faces 21, 22 and 23 form a hermetical seal which absolutely prevents the entrance of dirt, dust, water or moisture to the space between the inner and outer hub members, thereby preventing rust and corrosion.

One important feature of the invention is the fact that the hub members are both of practically uniform diameter from end to end, and this diameter can be made large enough so that the spokes are substantially tangential to both ends of the hub where they are secured thereto. The driving between the outer hub member and rim in each direction is therefore done by tension in half of both the front and rear row of spokes and not through only half of the rear row of spokes, as is the case when the hub is conical with the hub portion considerably smaller than the rear portion thereof.

With arrangements such as just referred to the spokes of the outer row are practically radial, due to the small size of the hub where they are secured, and therefore they do not take their share of the load. The jaw clutch between the inner and outer hub members, in connection with the clamping effect of the nut 16 makes the two hub members practically integral with each other, so that they do not tend to work loose or wear, as is the case when the driving is done through pins and the like.

What I claim is:

A vehicle wheel, comprising inner and outer hub members of different diameters with a space therebetween, the inner hub member having a beveled portion surrounding the outer hub member and closing said space at one end of the hub, a clamping nut having threaded engagement with the inner hub member and provided with a beveled hub portion surrounding the outer hub member for rigidly securing said members together and for closing said space at the other end of the hub, a rim, spokes connecting the outer hub member and rim, and interlocking jaw clutch driving members on said hub members and lying entirely within the space therebetween, said driving members having substantially radial side faces.

In testimony whereof, I have hereunto set my hand.

GEORGE BAEHR.

Witnesses:
 WILLIAM B. WHARTON,
 GLENN H. LERESCHE.